United States Patent
Duffney

(10) Patent No.: US 7,386,957 B2
(45) Date of Patent: Jun. 17, 2008

(54) NON-INTRUSIVE VAPOR COLLECTION APPARATUS

(75) Inventor: Eliott Nelson Duffney, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 11/536,706

(22) Filed: Sep. 29, 2006

(65) Prior Publication Data

US 2008/0080934 A1    Apr. 3, 2008

(51) Int. Cl.
*E02D 3/10* (2006.01)

(52) U.S. Cl. .................... 52/169.5; 454/909; 405/128.2

(58) Field of Classification Search .............. 52/169.5; 405/128.2; 454/909
See application file for complete search history.

(56) References Cited

U.S. PATENT DOCUMENTS

| | | | |
|---|---|---|---|
| 4,323,122 A | 4/1982 | Knopik | |
| 4,593,760 A | 6/1986 | Visser et al. | |
| 4,660,639 A | 4/1987 | Visser et al. | |
| RE33,102 E | 10/1989 | Visser et al. | |
| 4,984,594 A * | 1/1991 | Vinegar et al. | 134/21 |
| 5,107,642 A * | 4/1992 | Mogstad | 52/169.5 |
| 5,127,764 A | 7/1992 | Baer | |
| 5,137,764 A | 8/1992 | Doyle et al. | |
| 5,206,067 A * | 4/1993 | Bonzo | 428/119 |
| 5,619,832 A * | 4/1997 | Myrvold | 52/403.1 |
| 6,539,681 B1 * | 4/2003 | Siegmund | 52/403.1 |
| 2004/0018354 A1 * | 1/2004 | May | 428/317.3 |

OTHER PUBLICATIONS http://www.radonpds.com/radon_products_lister.asp?cat=Soil%20Gas%20Mat%20and%2 . . . , Soil Gas Mat and Barriers, printed Aug. 22, 2006: pp. 3.

* cited by examiner

*Primary Examiner*—John Kreck
(74) *Attorney, Agent, or Firm*—Pepper Hamilton LLP

(57) ABSTRACT

A non-intrusive vapor collection and abatement apparatus comprises an above-floor mat with a collection space underneath the above-floor mat within which air can pass freely hut which is surrounded by a substantially vapor-proof barrier. A vacuum or suction may be applied to the collection space to remove undesirable vapors.

13 Claims, 2 Drawing Sheets

NON-INTRUSIVE VAPOR COLLECTION APPARATUS

BACKGROUND

1. Technical Field

The disclosed embodiments generally relate to systems for vapor collection and abatement.

2. Description of the Related Art

Contaminants can exist in subsurface soil and groundwater in the liquid or vapor phase as discrete substances and mixed with and/or dissolved in groundwater and soil gases. Various contaminants can be found in groundwater and soil, such as volatile compounds, including volatile organic compounds, nonvolatile materials, metal contaminants, and the likes Such contaminats are generally found and dealt with in the vadose (unsaturated) zone found between the surface of the earth and the water table, at the interface between the vadose zone and the water table, and in the saturated zone below the water table.

Such contaminants are a problem for many people and facilities. At many industrial and commercial facilities and waste handling and disposal sites, soil and groundwater are contaminated with suspended or water-soluble chemicals, or both. Many commercial facilities such as manufacturing companies that store chemicals must meet environmental remediation requirements by showing that off gassing from soil or groundwater contamination has been substantially eliminated or mitigated. In climates which do not experience winter temperatures low enough to cause substantial freezing of the ground, houses and light commercial buildings are often constructed on relatively shallow foundations with the ground floor, typically a concrete slab, supported directly on grade. A finish floor, e.g., asphalt tile, wood, or the like, can be installed over the concrete slab by simply setting it in a mastic adhesive trowelled onto the substrate. In geographical areas where the water table is relatively close to the surface, this construction presents certain problems when flooring is laid directly on the concrete support, because water vapor migrating from the moist soil through the concrete slab can cause the wood flooring to swell and warp, and gas vapors such as radon may infiltrate from the soil into buildings. Thus, home owners/builders/contractors often must perform remedial or radon abatement applications in order to eliminate potential health risks posed by such harmful gasses.

A variety of techniques have been used for removal of contaminants and remediation of affected soil. One common technique entails the excavation and off-site treatment of the soil. Another technique entails saturating the contaminated soil with water in situ, causing the contaminants to be leached slowly from the soil by the water. The contaminated water can then be removed. U.S. Pat. No. 5,127,764, the disclosure of which is incorporated herein by reference in its entirety, discloses a floor structure incorporating a vapor and gas barrier that is comprised of layered materials that resist penetration of vapor and gas.

Techniques have also been proposed for removing volatile organic contaminants from soil by vacuum extraction. For example, in U.S. Pat. No. 4,323,122, the disclosure of which is incorporated herein by reference in its entirety, it was proposed that a vacuum be applied in a borehole at the level of the water table, the assumption being that a contaminant such as gasoline, which is lighter than water, would float on the water table and present a layer that could be drawn off by vacuum applied to the liquid at or around that level. U.S. Pat. No. 4,323,122 also discloses a system and method for recovering organic liquid such as gasoline which has settled on the water table in underground areas. The system comprises a conduit extending from the ground surface to a point just above the water table, a collection head fitted on the lower end of the conduit, a collection vessel connected to the upper end of the conduit, and an exhaust means for creating less than atmospheric pressure in the vessel. The collection head has a liquid impermeable end portion and a liquid permeable intermediate portion for permitting the passage of liquid. The process comprises providing an opening in the ground to a point beneath the surface of the water table, positioning the conduit with the collection head in place so that the liquid permeable wall of the collection head is just above the surface of the water table, connecting the conduit to the collection vessel intake, and exhausting air and other gaseous materials from the vessel to cause liquid to flow into the collection head through the conduit into the vessel.

Other techniques include the venting of soil above the water table (i.e. in the vadose zone) to cause vaporization of the contaminant in the soil, and then drawing off the contaminant in the vapor phase. Groundwater requiring treatment is in such processes conventionally removed by pumping from separate conventional water wells. In situations in which water does flow into vacuum extraction wells, it has been suggested that a second, liquid phase pump be placed either in the well or at the surface to remove the water through a second conduit. For example, U.S. Pat. No. 4,660,639, the disclosure of which is incorporated herein by reference in its entirety, discloses a process for the removal of volatile contaminants from the vadose zone of contaminated ground by extracting volatilized contaminants from the vadose zone by way of one or more vacuum extraction wells. The process entails drilling one or more wells into the subsurface media in the contaminated area, the well being constructed so that fluids in the vadose zone can flow into the well, whereas the liquid in the saturated zone below the water table cannot substantially flow into the well, The borehole and conduit of the well can optionally extend below the water table, in which case the vacuum applied to the upper portion of the conduit will be effective to draw contaminant from the vadose zone, but insufficient to draw a significant amount of water from the saturated zone into the conduit. If it is desired to remove groundwater from below the water table, this removal is accomplished either by a separate sampling device situated in the borehole or through a separate well.

In addition, Stinson, "EPA Site Demonstration of the Terra Vac In Situ Vacuum Extraction Process in Groveland, Mass.", Air & Waste Management Association, Vol. 39, No. 8, pages 1054 to 1062 (1989), discloses an evaluation of an in situ vacuum extraction process. The process entails removal of contaminants from the vadose zone by vacuum. Wells are installed in the contaminated vadose soil. A vacuum pump or blower induces air flow through the soil, stripping and volatilizing volatile organic compounds from the soil matrix into the air stream. Liquid water, if present in the soil, is also extracted along with the contamination. The two-phase stream of contaminated air and water flows to a vapor/liquid separator where contaminated water is removed. The contaminated air stream then flows through a treatment system such as gas-phase activated carbon to remove contaminants from the air stream. The clean air is exhausted to the atmosphere through a vent. U.S. Pat. No. 4,593,760 and U.S. Pat. No. Re. 33,102, the disclosures of which are incorporated herein by reference in their entirety, also disclose processes for removal of volatile contaminants from the vadose zone of contaminated ground by pumping volatilized contaminants from the vadose zone using one or more vacuum extraction wells.

Although known apparatus and processes are suitable for their intended purposes, they are complicated, expensive, and intrusive, requiring excavation or drilling through concrete to accomplish subsurface vacuum readings. Drilling and installation of piping through floors can be costly, and since this is still a relatively imperfect science, there is a risk of contamination if a hole is drilled where the water table is high. Moreover, traditional solutions may not provide the desired coverage de to heterogeneous subsurface conditions. The disclosure contained herein describes attempts to address one or more of the problems described above.

SUMMARY

In an embodiment, a vapor collection structure includes a layer of substantially vapor-proof material, and a support structure that extends from the layer of substantially vapor-proof material to provide a gas containment space under the layer of substantially vapor-proof material when installed over a floor or ground surface. The gas containment space allows for the movement of air throughout the space. The structure also may include a gas delivery channel and a fluidly connected vacuum source. The vapor collection structure receives vapors that pass through the floor without penetrating the floor or ground surface. The layer of substantially vapor-proof material may include plastic, metal, or other material. The support structure may include several individual supports, a honeycomb structure, or another suitable structure. In some embodiments, the vapor collection structure may be connected to at least one second vapor collection structure by a connector. The second vapor collection structure also may have a layer of substantially vapor-proof material and a support structure that extends from the layer of substantially vapor-proof material to provide a gas containment space under the layer of substantially vapor-proof material when installed over a floor. Air may pass between the gas containment space of the first structure and the gas containment space of the second structure. The support structure may have any suitable height, such as from about ⅓ inch to about ¾ inch in height.

In an alternate embodiment, an apparatus for removing vapors includes a substantially vapor-proof layer, and supporting structures that extend from the substantially vapor-proof layer, support the substantially vapor-proof layer, and form an air collection space. When positioned over a floor or ground, the gas collection space contains gas that rises from the floor or ground. A vacuum source may be fluidly connected to the substantially vapor-proof layer to draw air from the air collection space. When installed and the vacuum source is operand, air pressure in the air collection space may be lower than atmospheric pressure. The supporting structures may form tubes, grooves, contours or other structures.

In another embodiment, a gas collection structure includes a plurality of mats, each mat comprising an upper layer of substantially vapor-proof material and a support structure that extends from the upper layer and supports the upper layer to provide an air containment space under the upper layer. Each mat may be joined to an adjacent mat by a substantially vapor-proof connector so that the plurality of mats form a collective air containment space in which air passes under the plurality of mats. The gas collection device also may include a gas delivery channel through which air from the collective air containment space may be exhausted, as well as a suction device that draws air from the collective air containment space through the gas delivery channel. When the gas collection structure is installed and the suction device is operated, air pressure in the gas containment space may be lower than atmospheric pressure. The support structure for each mat may include a plurality of supports, a honeycomb structure, or another suitable structure.

DETAILED DESCRIPTION

Before the present methods, systems and materials are described, it is to be understood that this disclosure is not limited to the particular methodologies, systems and materials described, as these may vary. It is also to be understood that the terminology used in the description is for the purpose of describing the particular versions or embodiments only, and is not intended to limit the scope. For example, as used herein and in the appended claims, the singular forms "a," "an," and "the" include plural references unless the context clearly dictates otherwise. In addition, the word "comprising" as used herein is intended to mean "including but not limited to." Unless defined otherwise, all technical and scientific terms used herein have the same meanings as commonly understood by one of ordinary skill in the art. Thus, for example, reference to a "floor" is a reference to any type of building foundation, such as grade or concrete slab, thereof known to those skilled in the art, and so forth.

Figure 1:
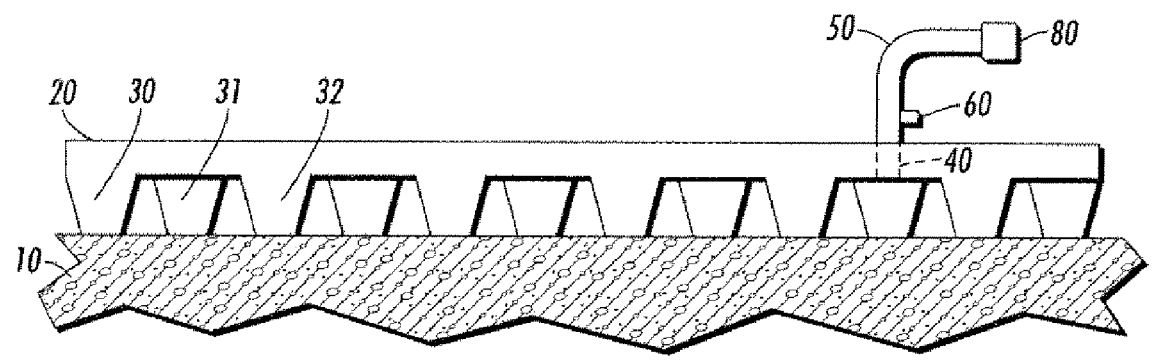
FIG. 1 depicts a lateral view of an exemplary embodiment of a floor structure.

In accordance with one embodiment, FIG. 1 illustrates a lateral view of a floor structure such as an above-floor mat for collecting and abating vapors that is placed directly on the concrete slab, grade, or other foundation of a building 10. The floor structure comprises at least one layer of substantially vapor-proof material or vapor barrier 20 having a generally smooth and planar upper surface over which a person may walk, or a vehicle may drive There may, however, be deviations from planarity that will affect the functionality of the floor structure as it is utilized within the building, but planarity deviations will not affect the functionality of the floor substrate as a vapor collection/abatement apparatus. By "vapors" it is meant any gases or vapors that are undesirable. The vapors may have arisen from the off-gassing of soil or groundwater contaminants, but ale not limited to these.

The floor structure may be comprised of modular, standardized units or dimensions, or it may be a monolithic or single piece, depending on the specific application. If the structure is comprised of standardized units that are connected together, the connectors between the units are also substantially vapor-proof. The connection of units can be accomplished by any suitable means that establishes a substantially vapor-proof seal joint, or seam, such as by either melting component pieces together, establishing a vapor resistant taped joint, or interlocking pieces in a manner that inhibits vapor migration through the resulting seam. The connector may be any type of connector now or hereinafter known, such as, for example, a plastic extension of the floor mat made of materials that are similar to the floor mat, such that the connector is also substantially vapor-proof, overlaps an adjacent unit, and air may travel through the gas collection spaces from one unit to another. The connector may alternatively refer to the edges of the units where the units interlock, as in a puzzle, in an air-tight manner that does not allow air to escape from between the units.

The substantially vapor-proof material may be any material or materials such as plastic or vinyl that is substantially impermeable to water vapor and/or harmful gasses such as, for example, radon. By "substantially vapor-proof" it is meant that the material may be any material that is substantially impermeable to groundwater vapor and/or soil gas vapor—absolute impermeability is desirable but not required. For example, the substantially vapor-proof material 20 of the floor structure may incorporate a vapor and gas barrier that is comprised of layered materials, where the vapor barrier may be made from any synthetic resin film exhibiting a low permeability to water vapor such as polyolefin films such as polyethylene, polypropylene, polybutylene and the like, as well as polyvinylidene chloride and the like. For example, the vapor barrier may be comprised of a laminate of thin metallic foil and a synthetic resin film, where the polymeric layer can be any synthetic resin having suitable properties for being formed into a self-supporting film. Additionally, the material may include provisions for reinforcing with material such as steel or any other metal in order to help maintain structural integrity of the floor structure.

Figure 2:
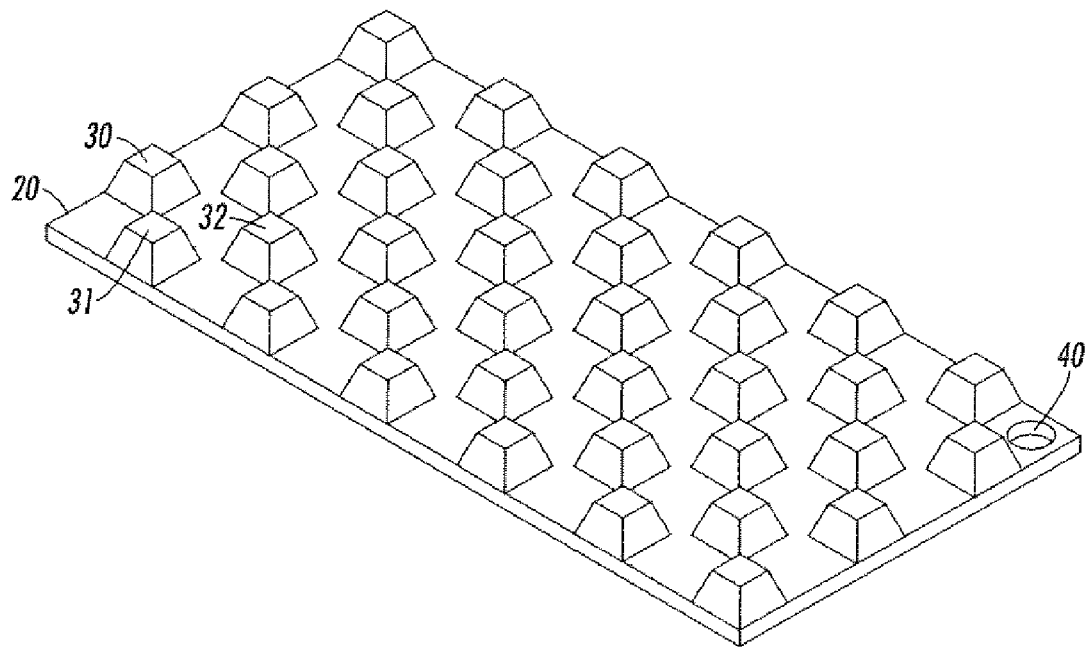
FIG. 2 depicts the underneath surface and support structure of an exemplary embodiment of a floor structure.
Figure 3:
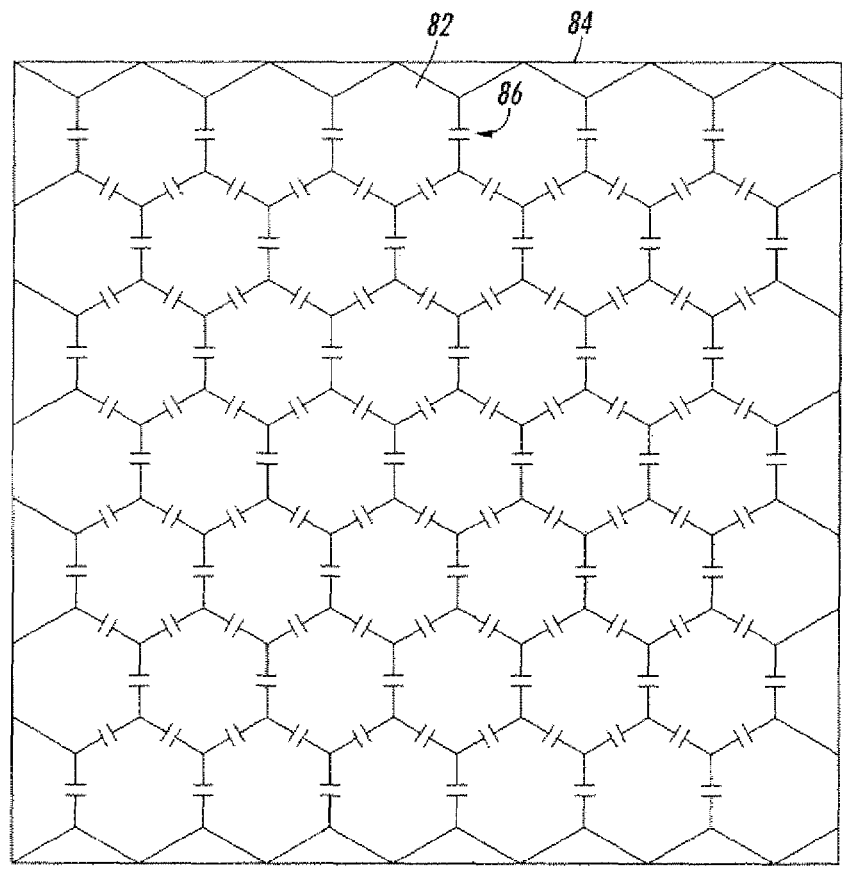
FIG. 3 depicts an alternate support structure.

As depicted in FIG. 2, the underneath surface of the floor structure may be made of any type of material optionally thick plastic, and may have a supporting structure design with supports 30, 31, 32 at various locations that extend from the top of the underneath surface to the floor, or ground foundation which may be concrete slab or grade. Any design will work as long as each support is situated in a location to create a gas containment space, such as a collection space or grid between the underneath surface of the vapor barrier 20 and the floor or ground surface (e.g., ground foundation, concrete slab, floor tile, soil grade or other similar surface) 10 that allows air to pass freely throughout the containment space. In FIG. 1, for example, support 31 is located on the same plane but behind supports 30 and 32, as depicted in the top view of FIG. 2. All supports may be of the same height, or supports may be of different heights to permit air flow. For example, FIG. 3 illustrates an alternate structure in which supports 82 are provided in a honeycomb pattern under a substantially vapor-proof barrier 84. Some or all of the supports 82 include passages or openings 86, is such as grooves, tunnels, holes or other structures to permit air to move around through the pattern.

The supports may form passageways such as tithes, grooves, contours, or the like within the collection space to facilitate the flow of air. The supports may be made of any type of plastic or other material that is rigid enough to support people walking on the floor structure, or in industrial applications, vehicles such as cars, trucks, construction vehicles, and the like driving on it. Thus, in some embodiments, the material may be generally rigid enough so that the floor structure is able to support at least about 500 pounds, at least 1,000 pounds, at least 2,000 pounds, at least 3,000 pounds or more. The supports may also include provisions for reinforcing with material such as steel or another metal in order to help maintain structural integrity of the floor structure. The supports are positioned close enough to each other to prevent significant sagging or bowing of the upper surface of the floor structure. In some embodiments, the supports may have a height in the range of about ⅓ inch to about ¾ inch high. Other heights are possible.

Returning to FIG. 1 the floor structure contains at least one hole or open space 40 that forms a gas delivery channel either alone or in combination with a channel, pipe, or other gas conveying structure 50. It is important to note that this floor structure does not require drilling into the ground beneath the floor of the building it is non-intrusive and may be installed after the building has been completely constructed without any further excavation. A vacuum or suction is applied to the gas delivery channel 40 and 50 through the use of any type of vacuum source 60, such as a vacuum pump driven by an electric motor. The vacuum source is fluidly connected to the gas delivery channel 40 and 50, and when the vacuum or suction is applied, a negative pressure is created within the collection space. As depicted by the arrows, the vacuum 60 draws gases that have arisen from soil and/or groundwater into the gas delivery channel 50 and transports the gases to an exhaust 70 which conducts the vapors to the atmosphere or to a as treatment device 80 such as a filter, converter, burner, or other device for treatment or collection. Any known or hereafter known vacuum extraction system may be used, such as, for example, those described in U.S. Pat. No. 5,358.357 and U.S. Pat. No. 5,655,852, the disclosures of which are incorporated herein by reference in their entirety. U.S. Pat. No. 5,358,357, for example, describes a vacuum extraction pipe that is equipped with at least one gas inlet to introduce nutrients for biotransformation and treating soil contaminants.

Installation of the floor structure may extend over the entire Door from wall-to-wall such that vapors rising through the slab are stopped by the vapor-proof barrier and directed by the vacuum to the gas delivery channel. Optionally, the floor structure may be used in sub-grade installations and may be installed over below-grade walls as well as over a floor.

Figure 4:
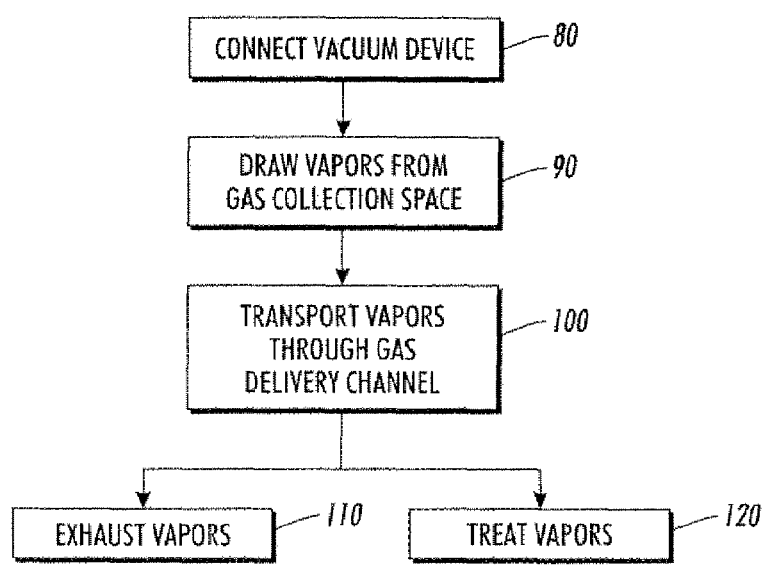
FIG. 4 is a flow diagram of a method of removing undesirable vapors through an above-floor mat.

FIG. 4 depicts a method of removing undesirable vapors through an above-floor (,as collection structure from a contaminated space where air can pass freely under the collection structure and above the floor of a building, without drilling into or penetrating the ground beneath the building. The method comprises connecting a vacuum source such as a vacuum extraction pipe to a hole in the floor mat 80. Any known vacuum extraction pipe or system may be used, such as, for example, those described in U.S. Pat. No. 5,58,357 and U.S. Pat. No. 5,655,852, the disclosures of which are incorporated herein by reference in their entirety. The method further includes applying a vacuum to the vacuum extraction pipe to draw the undesirable vapors from the contaminated space 90, and transporting the vapors through the vacuum extraction pipe 100. The vapors may be exhausted to the atmosphere 110, or may be transported from the vacuum extraction pipe to a separator or other treatment system for processing 120.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A vapor collection structure comprising:
a layer of substantially vapor-proof material; and
a plurality of rigid support structures that extend from the layer of substantially vapor-proof material and contact a floor of a building when placed in operation;
wherein the plurality of rigid support structures are arranged in a honeycomb pattern;
wherein at least some of the support structures include openings to permit the movement of gas therethrough;
wherein the layer of substantially vapor proof material and the plurality of rigid support structures in contact with the floor define a gas containment space; and
wherein at least some of the rigid support structures define passageways that allow for the movement of gas throughout the space.

2. The vapor collection structure of claim 1, further comprising a gas delivery channel.

3. The vapor collection structure of claim 1, wherein the vapor collection structure, when placed in operation, receives vapors that pass through the floor without the vapor collection structure penetrating the floor.

4. The vapor collection structure of claim 1, wherein the layer of substantially vapor-proof material comprises a metal.

5. The vapor collection structure of claim 1 wherein the layer of substantially vapor-proof material comprises a plastic.

6. The vapor collection structure of claim 1, wherein the vapor collection structure is connected to a second vapor collection structure by a vapor proof connector, the second vapor collection structure comprising:
a second layer of substantially vapor-proof material; and
a support structure that extends from the second layer of substantially vapor-proof material to provide a second space under the second layer of substantially vapor-proof material when installed over a floor of a building;
wherein gas may pass between the gas containment space of the vapor collection structure and the second space; and
wherein the gas containment space and the second space provide a wall-to-wall gas containment space.

7. The vapor collection structure of claim 1, wherein the plurality of rigid support structures measures from about ⅓ inch to about ¾ inch in height.

8. The vapor collection structure of claim 2, further comprising a vacuum source that is fluidly connected to the gas delivery channel.

9. The vapor collection structure of claim 1, wherein the gas containment space is in a wail-to-wall configuration that covers the entire foot.

10. A gas collection structure comprising:
a plurality of mats, each mat comprising:
a substantially vapor-proof upper layer; and
a plurality of rigid support structures that extend from the upper Layer and support the upper layer and contact a floor of a building when placed in operation;
wherein the upper layer and the plurality of rigid support structures in contact with the floor define an air containment space under the upper layer;
wherein the plurality of rigid support structures for each mat comprises a honeycomb pattern;
wherein at least some of the support structures include a passage to permit movement of air therethrough
wherein at least some of the rigid support structures define passageways that allow for the movement of air throughout the space; and
wherein each mat is joined to an adjacent mat by a substantially vapor-proof connector so that the plurality of mats form a wall-to-wall collective air containment space in which air passes under the plurality of mats.

11. The gas collection structure of claim 10 further comprising a gas delivery channel through which air from the collective air containment space may be exhausted.

12. The gas collection structure of claim 11, further comprising a suction device that draws air from the collective air containment space through the gas delivery channel.

13. The gas collection structure of claim 11, wherein, when installed and the suction device is operated, air pressure in the air containment space is lower than atmospheric pressure.

* * * * *